US008573341B2

(12) United States Patent
Fought

(10) Patent No.: US 8,573,341 B2
(45) Date of Patent: *Nov. 5, 2013

(54) WHEELCHAIR SUSPENSION

(75) Inventor: Gerald E. Fought, Columbia Station, OH (US)

(73) Assignee: Invacare Corporation, Elyria, OH (US)

( * ) Notice: Subject to any disclaimer, the term of this patent is extended or adjusted under 35 U.S.C. 154(b) by 946 days.

This patent is subject to a terminal disclaimer.

(21) Appl. No.: 12/118,099

(22) Filed: May 9, 2008

(65) Prior Publication Data

US 2008/0208394 A1 Aug. 28, 2008

Related U.S. Application Data

(63) Continuation of application No. 11/474,834, filed on Jun. 26, 2006, now Pat. No. 7,374,002, which is a continuation of application No. 10/044,826, filed on Oct. 19, 2001, now Pat. No. 7,066,290.

(51) Int. Cl.
*B60G 5/04* (2006.01)

(52) U.S. Cl.
USPC ........................... 180/65.5; 180/907; 280/755

(58) Field of Classification Search
USPC ............. 280/124.1, 5.28, 755, 767; 180/65.1, 180/65.5, 907, 59, 60, 6.5, 24.02, 24.03, 180/24.07, 65.51
See application file for complete search history.

(56) References Cited

U.S. PATENT DOCUMENTS 1,773,254 A 9/1930 Becker
1,973,627 A 9/1934 Harter
2,398,211 A 4/1946 du Pont
2,427,482 A 9/1947 Wiessman
2,767,995 A 10/1956 Stout
2,949,153 A 8/1960 Hickman
2,986,200 A 5/1961 Nobile
3,104,112 A 9/1963 Crail
3,174,176 A 3/1965 Olson
3,191,990 A 6/1965 Rugg et al.
3,195,670 A 7/1965 Dunn
3,210,092 A 10/1965 Kraus
3,282,605 A 11/1966 Nihlean et al.
3,314,672 A 4/1967 Persson
3,573,877 A 4/1971 Locke
3,580,591 A 5/1971 Coffey
3,589,700 A 6/1971 Ruet et al.

(Continued)

FOREIGN PATENT DOCUMENTS

CA 2254372 5/2000
DE 19806500 8/1999

(Continued)

OTHER PUBLICATIONS

"Big Bounder Power Wheelchair: Conventional "Tubular" Style Frame"; http://www.wheelchair.com/bigbounderpage.htm, Accessed on the World Wide Web on Dec. 17, 2003, p. 1-4.

(Continued)

*Primary Examiner* — Anne Marie Boehler
(74) *Attorney, Agent, or Firm* — Calfee, Halter & Griswold LLP

(57) ABSTRACT

The present invention provides a suspension for a conveyance that is capable of traversing obstacles and rough terrain. The suspension includes a frame, a pivot arm, a front caster, a drive assembly and a rear caster. The pivot arm and the drive assembly are coupled and decoupled based on movement of the drive assembly.

25 Claims, 9 Drawing Sheets

(56) References Cited

U.S. PATENT DOCUMENTS 3,592,282 A 7/1971 Soileau
3,602,522 A 8/1971 Zamotin
3,661,228 A 5/1972 Glasser
3,664,450 A 5/1972 Udden et al.
3,682,462 A 8/1972 Papousek
3,689,103 A 9/1972 Meulendyk
3,709,313 A 1/1973 James
3,848,883 A 11/1974 Breacain
3,862,751 A 1/1975 Schwaller
3,876,012 A 4/1975 Regier
3,881,773 A 5/1975 Rodaway
3,883,153 A 5/1975 Singh et al.
3,893,529 A 7/1975 Karchak, Jr. et al.
3,901,337 A 8/1975 Cragg
3,901,527 A 8/1975 Danziger et al.
3,905,437 A 9/1975 Kaiho et al.
3,917,312 A 11/1975 Rodaway
3,930,551 A 1/1976 Cragg
3,952,822 A 4/1976 Udden et al.
3,953,054 A 4/1976 Udden et al.
3,976,152 A 8/1976 Bell
4,078,817 A 3/1978 Ferguson et al.
4,108,449 A 8/1978 Rhodes
4,118,020 A 10/1978 Myers
4,119,163 A 10/1978 Ball
4,128,137 A 12/1978 Booth
4,190,263 A 2/1980 Powers
4,222,449 A 9/1980 Feliz
4,245,847 A 1/1981 Knott
4,264,085 A 4/1981 Volin
4,310,167 A 1/1982 McLaurin
4,333,681 A 6/1982 Nelson
4,337,958 A 7/1982 Witt et al.
4,341,278 A 7/1982 Meyer
4,375,295 A 3/1983 Volin
4,387,325 A 6/1983 Klimo
4,405,142 A 9/1983 Whetstine
4,436,320 A 3/1984 Brudermann et al.
4,437,678 A 3/1984 Schultz
4,455,029 A 6/1984 Taylor
4,455,031 A 6/1984 Hosaka
4,456,295 A 6/1984 Francu
4,483,407 A 11/1984 Iwamoto et al.
4,500,102 A 2/1985 Haury et al.
4,513,832 A 4/1985 Engman
4,515,385 A 5/1985 Christian
4,542,918 A 9/1985 Singleton
4,545,593 A 10/1985 Farnam
4,545,616 A 10/1985 Booth
4,556,229 A 12/1985 Bihler et al.
4,565,385 A 1/1986 Morford
RE32,242 E 9/1986 Minnebraker
4,618,155 A 10/1986 Jayne
4,641,848 A 2/1987 Ayers
4,655,471 A 4/1987 Peek
4,687,068 A 8/1987 Pagett
4,720,223 A 1/1988 Neights et al.
4,721,321 A 1/1988 Haury et al.
4,721,322 A 1/1988 Hawkins
4,730,842 A 3/1988 Summers et al.
4,736,983 A 4/1988 Furbee
4,759,418 A 7/1988 Goldenfeld et al.
4,763,910 A 8/1988 Brandli et al.
4,805,712 A 2/1989 Singleton
4,805,925 A 2/1989 Haury et al.
4,811,966 A 3/1989 Singleton
4,823,900 A 4/1989 Farnam
4,826,194 A 5/1989 Sakita
4,840,394 A 6/1989 Bickler
4,861,056 A 8/1989 Duffy, Jr. et al.
4,862,983 A 9/1989 Kreft
4,886,294 A 12/1989 Nahachewski
4,905,972 A 3/1990 Scowen
4,919,441 A 4/1990 Marier et al.
4,926,952 A 5/1990 Farnam
4,934,626 A 6/1990 Kimura
4,962,942 A 10/1990 Barnett et al.
4,967,864 A 11/1990 Boyer et al.
4,989,890 A 2/1991 Lockard et al.
5,020,816 A 6/1991 Mulholland
5,044,647 A 9/1991 Patterson
5,044,648 A 9/1991 Knapp
5,076,390 A 12/1991 Haskins
5,076,602 A 12/1991 Robertson et al.
5,113,959 A 5/1992 Mastov et al.
5,123,495 A 6/1992 Littlejohn et al.
5,125,468 A 6/1992 Coker
5,137,295 A 8/1992 Peek
5,156,226 A 10/1992 Boyer et al.
5,176,393 A 1/1993 Robertson et al.
5,180,025 A 1/1993 Yeh et al.
5,180,275 A 1/1993 Czech et al.
5,181,133 A 1/1993 Lipton
5,181,733 A 1/1993 Tague
5,183,133 A 2/1993 Roy et al.
5,197,559 A 3/1993 Garin, III et al.
5,203,610 A 4/1993 Miller
5,209,509 A 5/1993 Gay et al.
5,222,567 A 6/1993 Broadhead et al.
5,228,709 A 7/1993 Kao
5,230,522 A 7/1993 Gehlsen et al.
5,241,876 A 9/1993 Mathis
5,248,007 A 9/1993 Watkins et al.
5,290,055 A 3/1994 Treat, Jr.
5,294,141 A 3/1994 Mentessi et al.
5,297,021 A 3/1994 Koerlin et al.
5,301,964 A 4/1994 Papac
5,316,328 A 5/1994 Bussinger
5,341,533 A 8/1994 Seitz
5,351,744 A 10/1994 Larsson
5,351,774 A 10/1994 Okamoto
5,366,037 A 11/1994 Richey
5,372,211 A 12/1994 Wilcox et al.
5,403,031 A 4/1995 Gottschalk et al.
5,419,571 A 5/1995 Vaughan
5,435,404 A 7/1995 Garin, III
5,447,317 A 9/1995 Gehlsen et al.
5,464,271 A 11/1995 McFarland
5,467,838 A 11/1995 Wu
5,482,261 A 1/1996 Ortega
5,485,140 A 1/1996 Bussin
5,489,139 A 2/1996 McFarland
5,513,875 A 5/1996 Tahara et al.
5,518,081 A 5/1996 Thibodeau
5,531,284 A 7/1996 Okamoto
5,540,297 A 7/1996 Meier
5,562,172 A 10/1996 Mick
5,564,512 A 10/1996 Scheulderman
5,575,348 A 11/1996 Goertzen et al.
5,611,555 A 3/1997 Vidal
5,628,377 A 5/1997 LaGloan
5,701,122 A 12/1997 Canedy
5,727,802 A 3/1998 Garven, Jr. et al.
5,727,809 A 3/1998 Ordelman et al.
5,762,155 A 6/1998 Scheulderman
5,772,048 A 6/1998 Sopcisak
5,772,226 A 6/1998 Bobichon
5,772,237 A 6/1998 Finch et al.
D397,645 S 9/1998 Schaffner
5,833,248 A 11/1998 Eguchi
5,848,658 A 12/1998 Pulver
5,851,018 A 12/1998 Curran et al.
5,851,019 A 12/1998 Gill et al.
5,853,059 A 12/1998 Goertzen et al.
D404,693 S 1/1999 Schaffner
5,855,387 A 1/1999 Gill et al.
5,899,475 A 5/1999 Verhaeg et al.
5,904,214 A 5/1999 Lin
5,921,532 A 7/1999 Pierce et al.
5,944,131 A 8/1999 Schaffner et al.
5,954,351 A 9/1999 Koschinat
5,957,474 A 9/1999 Mundy et al.
5,964,473 A 10/1999 Degonda et al.
6,003,624 A 12/1999 Jorgensen et al.

(56) References Cited

U.S. PATENT DOCUMENTS

| | | | |
|---|---|---|---|
| 6,041,876 | A | 3/2000 | Pulver et al. |
| 6,047,979 | A | 4/2000 | Kraft et al. |
| 6,062,600 | A | 5/2000 | Kamen et al. |
| 6,070,898 | A | 6/2000 | Dickie et al. |
| 6,073,951 | A | 6/2000 | Jindra et al. |
| 6,079,698 | A | 6/2000 | Patterson et al. |
| 6,079,725 | A | 6/2000 | Lazaros |
| D429,665 | S | 8/2000 | Dickie |
| 6,129,165 | A | 10/2000 | Schaffner et al. |
| 6,131,679 | A | 10/2000 | Pulver et al. |
| 6,161,856 | A | 12/2000 | Peterson |
| 6,168,178 | B1 | 1/2001 | Garven, Jr. et al. |
| 6,176,335 | B1 | 1/2001 | Schaffner et al. |
| 6,179,076 | B1 | 1/2001 | Fernie et al. |
| 6,186,252 | B1 | 2/2001 | Schaffner et al. |
| 6,196,343 | B1 | 3/2001 | Strautnieks |
| 6,199,647 | B1 | 3/2001 | Schaffner et al. |
| 6,206,119 | B1 | 3/2001 | Wu |
| 6,209,670 | B1 | 4/2001 | Fernic et al. |
| 6,225,894 | B1 | 5/2001 | Kyrtsos |
| 6,234,263 | B1 | 5/2001 | Boivin et al. |
| 6,234,507 | B1 | 5/2001 | Dickie |
| 6,241,275 | B1 | 6/2001 | Slagerman |
| 6,264,218 | B1 | 7/2001 | Slagerman |
| 6,279,927 | B1 | 8/2001 | Nishihira et al. |
| 6,312,000 | B1 | 11/2001 | Pauls et al. |
| 6,322,089 | B1 | 11/2001 | Dantele et al. |
| 6,341,657 | B1 | 1/2002 | Hopely, Jr. et al. |
| 6,341,671 | B1 | 1/2002 | Ebersole |
| 6,347,688 | B1 | 2/2002 | Hall et al. |
| 6,357,793 | B1 | 3/2002 | Dickie et al. |
| 6,375,209 | B1 | 4/2002 | Schlangen |
| 6,394,738 | B1 | 5/2002 | Springer |
| 6,405,816 | B1 | 6/2002 | Kamen et al. |
| 6,425,597 | B1 | 7/2002 | Peterson |
| 6,428,020 | B1 | 8/2002 | Steadman |
| 6,429,541 | B2 | 8/2002 | Takenaka et al. |
| 6,454,286 | B1 | 9/2002 | Hosino |
| 6,460,641 | B1 | 10/2002 | Kral |
| 6,460,869 | B1 | 10/2002 | Tremouilles |
| 6,494,474 | B1 | 12/2002 | Kramer, Jr. |
| 6,533,305 | B1 | 3/2003 | Falk |
| 6,533,306 | B2 | 3/2003 | Watkins |
| 6,543,564 | B1 | 4/2003 | Kamen et al. |
| 6,543,798 | B2 | 4/2003 | Schaffner et al. |
| 6,554,086 | B1 | 4/2003 | Goertzen et al. |
| 6,568,030 | B1 | 5/2003 | Watanabe et al. |
| 6,581,711 | B1 | 6/2003 | Tuluie |
| 6,588,799 | B1 | 7/2003 | Sanchez |
| 6,640,916 | B2 | 11/2003 | Schaffner et al. |
| 6,688,437 | B2 | 2/2004 | Usherovich |
| 6,712,369 | B2 | 3/2004 | Wu |
| 6,715,845 | B2 | 4/2004 | Kamen et al. |
| 6,851,711 | B2 | 2/2005 | Goertzen et al. |
| 6,857,490 | B2 | 2/2005 | Quigg |
| 6,923,278 | B2 | 8/2005 | Mulhern et al. |
| 6,923,280 | B2 | 8/2005 | Goertzen et al. |
| 6,935,448 | B2 | 8/2005 | Goertzen et al. |
| 6,938,923 | B2 | 9/2005 | Mulhern et al. |
| 7,021,641 | B2 | 4/2006 | Wu |
| 7,040,429 | B2 | 5/2006 | Molnar et al. |
| 7,055,634 | B2 | 6/2006 | Molnar |
| 7,066,290 | B2 | 6/2006 | Fought |
| 7,083,195 | B2 | 8/2006 | Goertzen et al. |
| 7,100,716 | B2 | 9/2006 | Engels et al. |
| 7,175,193 | B2 | 2/2007 | Wu |
| 7,219,755 | B2 | 5/2007 | Goertzen et al. |
| 7,219,924 | B2 | 5/2007 | Mulhern et al. |
| 7,234,554 | B2 | 6/2007 | Mulhern et al. |
| 7,264,272 | B2 | 9/2007 | Mulhern et al. |
| 7,273,118 | B2 | 9/2007 | Huang |
| 7,293,801 | B2 | 11/2007 | Bertrand et al. |
| 7,370,876 | B2 | 5/2008 | Hsu et al. |
| 7,374,002 | B2 | 5/2008 | Fought |
| 7,380,824 | B2 | 6/2008 | Chen et al. |
| 7,389,835 | B2 | 6/2008 | Mulhern et al. |
| 7,413,038 | B2 | 8/2008 | Mulhern et al. |
| 7,472,767 | B2 | 1/2009 | Molnar |
| 7,490,683 | B2 | 2/2009 | Schaffner |
| 7,556,109 | B2 | 7/2009 | Chen et al. |
| 7,597,163 | B2 | 10/2009 | Goertzen et al. |
| 7,766,106 | B2 | 8/2010 | Puskar-Pasewicz et al. |
| 7,828,310 | B2 | 11/2010 | Vreeswijk et al. |
| 7,896,394 | B2 | 3/2011 | Jackson et al. |
| 8,172,015 | B2 | 5/2012 | Molnar |
| 8,172,016 | B2 | 5/2012 | Goertzen et al. |
| 8,177,257 | B2 | 5/2012 | Dugas et al. |
| 2003/0122332 | A1 | 7/2003 | Engels et al. |
| 2003/0168265 | A1 | 9/2003 | Goertzen et al. |
| 2004/0004342 | A1 | 1/2004 | Mulhern et al. |
| 2004/0032119 | A1 | 2/2004 | Tran |
| 2004/0084230 | A1 | 5/2004 | Grymko et al. |
| 2004/0094944 | A1 | 5/2004 | Goertzen et al. |
| 2004/0262859 | A1 | 12/2004 | Turturiello et al. |
| 2005/0077694 | A1 | 4/2005 | Levi et al. |
| 2005/0077715 | A1 | 4/2005 | Mulhern et al. |
| 2005/0206149 | A1 | 9/2005 | Mulhern et al. |
| 2005/0225040 | A1 | 10/2005 | Goertzen et al. |
| 2005/0225041 | A1 | 10/2005 | Longino |
| 2006/0021806 | A1 | 2/2006 | Goertzen et al. |
| 2006/0076747 | A1 | 4/2006 | Pauls et al. |
| 2006/0076748 | A1 | 4/2006 | Pauls et al. |
| 2006/0082117 | A1 | 4/2006 | Turturiello |
| 2006/0244249 | A1 | 11/2006 | Goertzen et al. |
| 2006/0255581 | A1 | 11/2006 | Goertzen et al. |
| 2007/0023209 | A1 | 2/2007 | Wu |
| 2007/0039766 | A1 | 2/2007 | Jackson et al. |
| 2007/0080003 | A1 | 4/2007 | Koerlin et al. |
| 2007/0107955 | A1 | 5/2007 | Puskar-Pasewicz et al. |
| 2009/0091092 | A1 | 4/2009 | Molnar |
| 2010/0004820 | A1 | 1/2010 | Bekoscke et al. |
| 2010/0013172 | A1 | 1/2010 | Goertzen |
| 2010/0084209 | A1 | 4/2010 | Bekoscke et al. |
| 2010/0102529 | A1 | 4/2010 | Lindenkamp et al. |
| 2012/0299262 | A1 | 11/2012 | Bekoscke |

FOREIGN PATENT DOCUMENTS

| | | | |
|---|---|---|---|
| DE | 10136368 | A1 | 2/2003 |
| DE | 10136369 | A1 | 2/2003 |
| EP | 18101 | | 10/1980 |
| EP | 0127929 | | 12/1984 |
| EP | 268960 | | 6/1988 |
| EP | 3126969 | | 4/1989 |
| EP | 339500 | | 11/1989 |
| EP | 369791 | | 5/1990 |
| EP | 419085 | | 3/1991 |
| EP | 445171 | | 9/1991 |
| EP | 511113 | | 10/1992 |
| EP | 0677285 | | 10/1995 |
| EP | 702945 | | 3/1996 |
| EP | 0829247 | | 3/1998 |
| EP | 841052 | | 5/1998 |
| EP | 0908165 | | 4/1999 |
| EP | 0908166 | | 4/1999 |
| EP | 927551 | | 7/1999 |
| EP | 0988848 | | 3/2000 |
| EP | 1147969 | | 10/2001 |
| EP | 1279391 | | 1/2003 |
| EP | 1279392 | | 1/2003 |
| EP | 1522295 | | 4/2005 |
| EP | 1582189 | | 10/2005 |
| EP | 1513479 | | 4/2006 |
| EP | 2226048 | | 9/2010 |
| FR | 2215054 | | 8/1974 |
| FR | 2399822 | | 3/1979 |
| FR | 2455886 | | 1/1981 |
| FR | 2498925 | | 8/1982 |
| FR | 2749502 | | 12/1997 |
| GB | 151915 | | 10/1920 |
| GB | 154369 | | 12/1920 |
| GB | 265885 | | 2/1927 |
| GB | 474349 | | 10/1937 |
| GB | 841175 | | 7/1960 |

(56) References Cited

FOREIGN PATENT DOCUMENTS

| | | |
|---|---|---|
| GB | 2040237 | 8/1980 |
| GB | 2061197 | 5/1981 |
| GB | 2141980 | 1/1985 |
| GB | 2224980 | 5/1990 |
| JP | 58-48304 | 3/1983 |
| JP | 03-011978 | 12/1989 |
| JP | 04-158864 | 6/1992 |
| JP | 07-328073 | 12/1995 |
| JP | 08-038552 | 2/1996 |
| JP | 410248877 | 9/1998 |
| JP | 11059506 | 3/1999 |
| JP | 2000102569 | 4/2000 |
| JP | 2000288032 | 10/2000 |
| JP | 2001070347 | 3/2001 |
| JP | 2001104391 | 4/2001 |
| JP | 2001212181 | 8/2001 |
| JP | 2001258948 | 9/2001 |
| JP | 2001327545 | 11/2001 |
| JP | 2002143223 | 5/2002 |
| JP | 2002165841 | 6/2002 |
| JP | 2004202264 | 7/2004 |
| WO | WO 82/00445 | 2/1982 |
| WO | WO 84/04451 | 11/1984 |
| WO | 9005515 | 5/1990 |
| WO | WO 90/06097 | 6/1990 |
| WO | WO 92/09463 | 6/1992 |
| WO | WO 93/24342 | 12/1993 |
| WO | 9413241 | 6/1994 |
| WO | 9415567 | 7/1994 |
| WO | WO 96/15752 | 5/1996 |
| WO | 9744206 | 11/1997 |
| WO | WO 98/46184 | 10/1998 |
| WO | 9917700 | 4/1999 |
| WO | WO 00/08910 | 2/2000 |
| WO | WO 00/09356 | 2/2000 |
| WO | WO 00/12040 | 3/2000 |
| WO | 0054718 | 9/2000 |
| WO | 0066060 | 11/2000 |
| WO | 0234190 | 5/2002 |
| WO | 03030800 | 4/2003 |
| WO | WO 03/034969 | 5/2003 |
| WO | 03-049664 | 6/2003 |
| WO | 03101364 | 12/2003 |
| WO | 2004016451 | 2/2004 |
| WO | 2004037569 | 5/2004 |
| WO | 2007011668 | 1/2007 |
| WO | 2007079346 | 7/2007 |
| WO | 2008084462 | 7/2008 |
| WO | 2008097879 | 8/2008 |
| WO | 2008100759 | 8/2008 |

OTHER PUBLICATIONS

"Bounder Plus Power Wheelchair: Convention "Tubular" Style Frame"; http://www.wheelchairs.com/plus.htm, Accessed on the World Wide Web on Dec. 17, 2003, p. 1-4.

"Frog Legs: Smoot Ride Ahead"; http://www.froglegsinc.com/index.php, Accessed on the World Wide Web on Dec. 17, 2003, p. 105.

"Frog Legs Tires", http://mdtap.org/tt/1999.09/prod.html, Accessed on the World Wide Web on Dec. 17, 2003, p. 1-3.

"Invacare pronto M7I jr. Power Wheelchair Manual"; Accessed on the World Wide Web on Dec. 17, 2003.

"Invacare Storm Series TDX Power Wheelchairs Manual"; Accessed on the World Wide Web on Dec. 17, 2003, p. 1-24.

"Invacare Xterra Series GT Power Wheelchair Manual", Accessed on the World Wide Web on Dec. 17, 2003, p. 1-4.

"Jazzy 1122", Pride Mobile Products Corp., Accessed on the World Wide Web on Dec. 17, 2003, p. 1-2.

"Jazzy 1133", Pride Mobile Products Corp., Accessed on the World Wide Web on Dec. 17, 2003, p. 1-2.

"Jazzy 1170XL", Pride Mobile Products Corp., Accessed on the World Wide Web on Dec. 17, 2003, p. 1-2.

"Bruno Independent Living Aids ISP 9001 Certified"; http://www.bruno.com/power__chairs.htm, Accessed on the World Wide Web on Dec. 17, 2003, p. 1-5 Top End Terminator SS Sp.

"Top End Terminator SS Sports Wheelchair", http://phc-online.com/terminator__ss.htm, Accessed on the World Wide Web on Dec. 17, 2003, p. 1-5.

"Transactions of the Institute of Measurement and Control", The British Library of Science Technology and Business, vol. 24, Nov. 5, 2002, p. 1-15.

M.J. Lawn, et al., "Modeling of a Stair-Climbing Wheelchair Mechanism with High Single-Step Capability", IEEE Transactions on Neutral Systems and Rehabilitation Engineering, V.

Quickie G-424 User Instruction Manual & Warranty, 930484 Rev. A (27 sheets) (alleged date not later than 2000).

10 photographs (8.5×11) of Quickie G-424 Wheelchair obtained Nov. 24, 2004.

Sunrise Medical, Inc., Power Products Parts Manual, 930307 Rev. K (531 Sheets), Jul. 2004. (Note: various dates are alleged therein based on wheelchair products listed includi.

International Search Report, Written Opinion and International Preliminary Examination Report from PCT/US02/02996, 16 pgs.

Office action from related U.S. Appl. No. 10/044,826 mailed Apr. 29, 2003.

Office action from U.S. Appl. No. 11/474,834, mailed Sep. 20, 2007.

"All-Terrain Wheelchair, Designer's Corner" Design News, Feb. 24, 1992, cover page and p. 54.

International Search Report from PCT/US98/07543, mailed Aug. 19, 1988.

International Search Report from PCT/US01/42656, mailed Jan. 14, 2003.

U.S. Patent Office Action dated Nov. 27, 2001 from U.S. Appl. No. 09/698,481.

U.S. Patent Office Action dated Jun. 27, 2002 from U.S. Appl. No. 09/698,481.

U.S. Patent Office Advisory Action dated Nov. 13, 2002 from U.S. Appl. No. 09/698,481.

U.S. Patent Office action dated Aug. 8, 2003 from U.S. Appl. No. 10/390,133.

U.S. Patent Office Action dated Jun. 16, 2004 from U.S. Appl. No. 10/390,133.

U.S. Patent Office Action dated Aug. 8, 2003 from U.S. Appl. No. 10/390,386.

U.S. Patent Office Action dated Jan. 28, 2004 from U.S. Appl. No. 10/390,386.

U.S. Patent Office Action dated Oct. 12, 2004 from U.S. Appl. No. 10/390,386.

U.S. Patent Office Action dated Sep. 8, 2006 from U.S. Appl. No. 11/145,477.

U.S. Office Action dated Mar. 28, 2006 from U.S. Appl. No. 11/145,477.

U.S. Patent Office Action dated Jul. 25, 2006 from U.S. Appl. No. 11/209,001.

U.S. Office Action dated Feb. 2, 2006 from Control No. 90/007,491.

U.S. Office Action dated Jul. 5, 2006 from Control No. 90/007,491.

U.S. Office Action dated Sep. 21, 2006 from Control No. 90/007,491.

Amendment dated Mar. 27, 2002 submitted during prosecution of U.S. Patent No. 6,554,086, 21 pages.

Notice of Allowance from U.S. Appl. No. 11/490,899, dated Jun. 6, 2007.

Complaint for Patent Infringement Demand for Jury Trial, Case No. 1:06CV0517.

Request for Reexamination of U.S. Patent No. 6,196,343, filed Apr. 28, 2006, 17 pages.

Affidavit dated Apr. 3, 2006 by Mark Sullivan submitted in reexamination Control No. 90/007,491, 5 pages.

Affidavit dated Apr. 3, 2006 by Gerold Goertzen submitted in reexamination Control No. 90/007,491, 7 pages.

U.S. Patent Office Action dated Nov. 8, 2006 from U.S. Appl. No. 11/490,899.

U.S. Patent Office Action dated Jan. 9, 2007 from U.S. Appl. No. 11/490,899.

Notice of Allowance dated Dec. 12, 2002 from U.S. Appl. No. 09/698,481.

(56) References Cited

OTHER PUBLICATIONS

Notice of Allowance dated Apr. 7, 2005 from U.S. Appl. No. 10/390,386.
Notice of Allowance dated Jan. 8, 2007 from U.S. Appl. No. 11/145,477.
Office Action dated Nov. 8, 2006 from U.S. Patent Appl. No. 11/209,001.
Office Action dated Mar. 30, 2005 from U.S. Appl. No. 10/390,133.
Notice of Allowance dated Apr. 11, 2005 from U.S. Appl. No. 10/390,133.
Supplemental Amendment after Final, dated Nov. 27, 2002 from U.S. Appl. No. 09/698,481, 2 pgs.
Notice of Allowance from U.S. Appl. No. 11/474,834, mailed Jan. 17, 2008.
Office action from U.S. Appl. No. 11/474,834, mailed Mar. 21, 2007.
Notice of Allowance from U.S. Appl. No. 12/523,630 dated Jun. 11, 2012.
European Search Report from EP Application No. 10167583.3 dated May 31, 2012.
Office Action from Canadian Application No. 2,690,500 dated Jun. 15, 2012.
Response to Office Action from Canadian Application No. 2,676,423 dated Jun. 7, 2012.
Response to Office Action from Canadian Application No. 2,676,724 dated Jun. 28, 2012.
European Search Report from EP Application No. 11184946.9 dated Jul. 5, 2012.
Office Action from U.S. Appl. No. 13/465,268 dated Jul. 19, 2012.
Notice of Allowance from U.S. Appl. No. 12/522,837 dated Jun. 28, 2012.
Office action from EP Application No. 11184946.9 dated Aug. 13, 2012.
European Search Report from EP Application No. 10167584.1 dated Aug. 8, 2012.
Office Action from Canadian Application No. 2,676,423 dated Aug. 6, 2012.
Notice of Allowance from U.S. Appl. No. 11/472,509 dated Oct. 19, 2012.
First Examination Report from AU Appli. No. 2010303354 dated Sep. 21, 2012.
Further Office Action from Canadian Application No. 2,676,724 dated Sep. 18, 2012.
Communication from EP Application No. 02775917.4 dated Oct. 25, 2012.
First Office Action in U.S. Appl. No. 13/566,473 dated Dec. 6, 2012.
First Office Action in Canadian Application No. 2,793,015 dated Nov. 23, 2012.
Response from U.S. Appl. No. 12/523,630 dated Mar. 15, 2012.
Response to Office Action from Canadian Application No. 2,495,751 dated Feb. 23, 2012.
Response to Office Action from Canadian Application No. 2,676,423 dated Nov. 7, 2011.
Office action from Canadian Application No. 2,676,724 dated Feb. 2, 2012.
Response to Office Action from Canadian Application No. 2,690,500 dated Apr. 3, 2012.
Response to Office Action from Canadian Application No. 2,700,672 dated Nov. 18, 2011.
Response to Communication from European Application No. 02775917.4 dated Sep. 6, 2011.
Communication from EP Application No. 03779341.1 dated Oct. 5, 2009.
Response to Communication from EP Application No. 08010025.8 dated Feb. 11, 2012.
Communication from EP Application No. 08729225.6 dated Mar. 1, 2010.
Response to Communication from EP Application No. 08729225.6 dated Jun. 21, 2010.
Response to Communication from European Application No. 01983183.3 dated Sep. 19, 2009.
Permobil Chairman HD3 Owner's Manual dated May 2003, 52 pages.
Permobil C400 Power Wheelchair, Owner's Manual, version 6, 2010, Permobil AB, Sweden, 100 pgs.
Permobil C500 Power Wheelchair, Owner's Manual, version 6, 2010, Permobil AB, Sweden, 100 pgs.
Pride Mobility, Jet 3 Ultra Owner's Manual dated Jun. 2007, 43 pages.
Quantum Series Owner's Manual dated Feb. 2009, 43 pages.
International Preliminary Examination Written Opinion from PCT/US02/29996 dated Jul. 31, 2003.
International Search Report from PCT/US02/29998 dated Dec. 12, 2002.
International Preliminary Examination Written Opinion from PCT/US02/29998 dated May 20, 2003.
International Preliminary Examination Report from PCT/US02129998 dated Jan. 13, 2004.
International Search Report and Written Opinion from PCT/US03/25736 dated Dec. 28, 2004.
International Search Report from PCT/US03/34124 Dated Dec. 28, 2004.
International Preliminary Examining Authority Written Opinion from PCT/US03/34124 dated Mar. 8, 2006.
International Preliminary Examination Report from PCT/US03/34124 dated Aug. 25, 2006.
International Search Report and Written Opinion from PCT/IB08/050111 dated Jun. 4, 2008.
International Search Report from and Written Opinion from PCT/US08/52878 dated Jul. 3, 2008.
International Search Report and Written Opinion from PCT/US08/53242 dated Sep. 3, 2008.
International Search Report and Written Opinion from PCT/US10/51888 dated Dec. 6, 2010.
Interview Summary from Control No. 90/007,491 dated Mar. 23, 2006.
Statement as to the substance of an Interview from Control No. 90/007,491 Apr. 3, 2006.
Response from Control No. 90/007,491 dated Apr. 3, 2006.
Response to Office action from Control No. 90/007,491 dated Sep. 11, 2006.
Response from Control No. 90/007,491 dated Nov. 9, 2006.
Notice of Appeal from Control No. 90/007,491 dated Nov. 9, 2006.
Advisory action from Control No. 90/007,491 dated Nov. 22, 2006.
Appeal Brief from Control No. 90/007,491 dated Jan. 16, 2007.
Advisory action from Control No. 90/007,491 dated Apr. 20, 2007.
Amended Appeal Brief from Control No. 90/007,491 dated Jun. 29, 2007.
Examiner's Answer from Control No. 90/007,491 dated Sep. 24, 2007.
Reply Brief from Control No. 90/007,491 dated Nov. 21, 2007.
Supplemental Examiner's Answer from Control No. 90/007,491 dated Dec. 18, 2007.
Request for Oral Hearing from Control No. 90/007,491 dated Feb. 19, 2008.
Reply Brief from Control No. 90/007,491 dated Feb. 19, 2008.
Office communication from Control No. 90/007,491 dated Mar. 14, 2008.
Office communication from Control No. 90/007,491 dated Jul. 3, 2008.
Notice of Hearing from Control No. 90/007,491 dated Aug. 22, 2008.
Hearing Attendance Confirmation from Control No. 90/007,491 dated Sep. 17, 2008.
Record of Oral Hearing from Control No. 90/007,491 dated Nov. 13, 2008.
Decision on Appeal from Control No. 90/007,491 dated Nov. 19, 2008.
Office action from U.S. Appl. No. 08/228,584 dated Apr. 14, 1995.
Response from U.S. Appl. No. 08/228,584 dated Jul. 6, 1995.
Office action from U.S. Appl. No. 08/228,584 dated Sep. 28, 1995.
Interview Summary from U.S. Appl. No. 08/228,584 dated Nov. 30, 1995.
Response from U.S. Appl. No. 08/228,584 dated Dec. 28, 1995.
Office action from U.S. Appl. No. 08/228,584 dated Mar. 29, 1996.

(56) References Cited

OTHER PUBLICATIONS

Response from U.S. Appl. No. 08/228,584 dated Jun. 3, 1996.
Notice of allowance from U.S. Appl. No. 08/228,584 dated Jun. 24, 1996.
Office action from U.S. Appl. No. 08/694,484 dated Dec. 2, 1996.
Response from U.S. Appl. No. 08/694,484 dated Apr. 2, 1997.
Office action from U.S. Appl. No. 08/694,484 dated Jul. 7, 1997.
Notice of Allowance from U.S. Appl. No. 12/330,554 dated Feb. 13, 2012.
Office action from U.S. Appl. No. 12/523,630 dated Dec. 21, 2011.
RCE with Remarks (Amendments to Specification) from U.S. Appl. No. 12/568,728 dated Jan. 9, 2012.
Notice of Allowance from U.S. Appl. No. 12/568,728 dated Jan. 24, 2012.
Office action from Canadian Application No. 2,676,423 dated Dec. 7, 2011.
Response to Office Action from European Application No. 11152661.2 dated Oct. 17, 2011.
Office Action from European Application No. 11152661.2 dated Jan. 27, 2012.
First Examination Report from AU Application No. 2010235847 dated Nov. 22, 2012.
Examination Report for NZ Application No. 599,108 dated Nov. 30, 2012.
Response to Office Action from U.S. Appl. No. 13/465,268 dated Jan. 22, 2013.
Office Action in U.S. Appl. No. 13/568,623 dated Feb. 1, 2013.
Office action from U.S. Appl. No. 10/762,977 dated Aug. 11, 2005.
Response from U.S. Appl. No. 10/762,977 dated Oct. 3, 2005.
Office action from U.S. Appl. No. 10/762,977 dated Oct. 25, 2005.
Notice of Allowance from U.S. Appl. No. 10/762,977 dated Feb. 23, 2006.
Notice of Allowance from U.S. Appl. No. 11/077,483 dated Aug. 9, 2007.
Response from U.S. Appl. No. 11/145,477 dated Dec. 12, 2006.
Notice of Abandonment from U.S. Appl. No. 11/209,001 dated Jul. 10, 2007.
Office action from U.S. Appl. No. 11/429,687 dated Apr. 9, 2008.
Response from U.S. Appl. No. 11/429,687 dated Jun. 17, 2008.
Notice of Allowance from U.S. Appl. No. 11/429,687 dated Sep. 8, 2008.
Office action from U.S. Appl. No. 11/472,509 dated May 4, 2007.
Interview Summary from U.S. Appl. No. 11/472,509 dated Aug. 3, 2007.
Response from U.S. Appl. No. 11/472,509 dated Aug. 3, 2007.
Office action from U.S. Appl. No. 11/472,509 dated Nov. 30, 2007.
Response from U.S. Appl. No. 11/472,509 dated Apr. 30, 2008.
Response from U.S. Appl. No. 11/472,509 dated Jul. 22, 2008.
Office action from U.S. Appl. No. 11/472,509 dated May 15, 2009.
Response from U.S. Appl. No. 11/472,509 dated Nov. 15, 2009.
Office action from U.S. Appl. No. 11/472,509 dated Sep. 2, 2010.
Response from U.S. Appl. No. 11/472,509 dated Jan. 3, 2011.
Notice of Appeal and Pre-Appeal Brief Request and Statement from U.S. Appl. No. 11/472,509 filed Mar. 2, 2011.
Interview Summary from U.S. Appl. No. 11/472,509 filed Mar. 2, 2011.
Non-Final Rejection from U.S. Appl. No. 11/472,509 dated Mar. 3, 2011.
Pre-Brief Appeal Conference Decision from U.S. Appl. No. 11/472,509 dated Mar. 23, 2011.
Non-Final Rejection from U.S. Appl. No. 11/472,509 dated Apr. 7, 2011.
Response from U.S. Appl. No. 11/472,509 dated Aug. 8, 2011.
Response from U.S. Appl. No. 11/474,834 dated Jun. 28, 2007.
Response from U.S. Appl. No. 11/474,834 dated Nov. 20, 2007.
Response from U.S. Seral No. 11/490,899 dated Mar. 20, 2007.
Notice of Allowance from U.S. Appl. No. 11/490,899 dated Feb. 10, 2009.
Notice of Allowance from U.S. Appl. No. 11/490,899 dated May 26, 2009.
Office Action from U.S. Appl. No. 12/330,554 dated Apr. 11, 2011.
Response to Office Action from U.S. Appl. No. 12/330,554 dated Jul. 11, 2011.
Office action from U.S. Appl. No. 12/522,837 dated Feb. 15, 2011.
Office action from U.S. Appl. No. 12/568,728 dated Jun. 10, 2010.
Response from U.S. Appl. No. 12/568,728 dated Nov. 5, 2010.
Office action from U.S. Appl. No. 12/568,728 dated Jan. 24, 2011.
Examiner's First Report for AU Appl. No. 2002341765 dated Apr. 30, 2007.
Response to Examiner's First Report for AU Appl. No. 2002341765 dated Apr. 8, 2008.
Examiner's First Report for AU Appl. No. 2003285024 dated Feb. 24, 2009.
Examiner's First Report for AU Appl. No. 2008214045 dated Jun. 22, 2010.
Response to Examiner's First Report for AU Appl. No. 2008214045 dated Sep. 30, 2010.
Response to Office action from Canadian Application No. 2,399,787 dated Nov. 2, 2005.
Office action from Canadian Application No. 2,463,296 dated Apr. 18, 2007.
Response to Office action from Canadian Application No. 2,463,296 dated Aug. 31, 2007.
Office action from Canadian Application No. 2,463,296 dated Feb. 1, 2008.
Response to Office action from Canadian Application No. 2,463,296 dated Jul. 29, 2008.
Office action from Canadian Application No. 2,463,296 dated Feb. 25, 2009.
Response to Office action from Canadian Application No. 2,463,296 dated Aug. 21, 2009.
Office action from Canadian Application No. 2,467,696 dated Apr. 18, 2007.
Response to Office action from Canadian Application No. 2,467,696 dated Oct. 15, 2007.
Office action from Canadian Application No. 2,495,751 dated Dec. 10, 2010.
Office action from Canadian Application No. 2,676,423 dated May 9, 2011.
Office action from Canadian Application No. 2,700,672 dated May 19, 2011.
Communication from European Application No. 95301059.2-2310 dated Oct. 13, 1998.
Response to Communication from European Application No. 95301059.2-2310 dated Apr. 23, 1999.
Communication from European Application No. 01983183.3 dated Jun. 13, 2007.
Communication from European Application No. 02775916.6 dated Jan. 22, 2009.
Response from European Application No. 02775916.6 dated Sep. 17, 2009.
Communication from European Application No. 02775917.4 dated Oct. 6, 2009.
Response from European Application No. 02775917.4 dated Mar. 16, 2010.
Communication from European Application No. 02275917.4 dated May 2, 2011.
Communication forwarding Supplemental EP Search report from Application No. 03779341.1 dated May 4, 2009.
European Search Report from 08010025.8 dated Apr. 29, 2009.
Supplemental Search Report from 08010025.8 dated May 19, 2009.
European Search Report from 10188280.1 dated Feb. 9, 2011.
Communication from European Application No. 10188366.8 dated Dec. 9, 2010.
Response to Communication from European Application No. 10188366.8 dated Jul. 12, 2011.
Communication from European Application No. 10188376.7 dated Dec. 23, 2010.
European Search Report from European Application No. 11152661.2 dated Mar. 7, 2011.
Office action from Chinese Patent Appl. No. 200880004382.8 (PCT/US2008/052878) dated Mar. 7, 2011.

(56) References Cited

OTHER PUBLICATIONS

Response to Office action from Chinese Patent Appl. No. 200880004382.8 (PCT/US2008/052878) dated Jun. 3, 2011.
Response to Preliminary Examination Report for NZ Appl. No. 510619 dated Jun. 6, 2001.
Examination Report for NZ Appl. No. 510619 dated Nov. 21, 2001.
Response to Nov. 21, 2001 Examination Report for NZ Appl. No. 510619 dated Dec. 20, 2001.
Examination Report for NZ Appl. No. 521169 dated Feb. 28, 2005.
Response to Examination Report for NZ Appl. No. 521169 dated Nov. 2, 2005.
Examination Report for NZ Appl. No. 532326 dated Jun. 9, 2005.
Examination Report for NZ Appl. No. 532715 dated Jun. 1, 2004.
Response to Examination Report for NZ Appl. No. 532715 dated Oct. 12, 2005.
Examination Report for NZ Appl. No. 532715 dated Nov. 15, 2005.
Response to Examination Report for NZ Appl. No. 532715 dated Dec. 7, 2005.
Examination Report for NZ Appl. No. 533122 dated May 9, 2007.
Office action from U.S. Appl. No. 08/694,484 dated Dec. 3, 1997.
Office action from U.S. Appl. No. 08/694,484 dated Feb. 10, 1998.
Response from U.S. Appl. No. 08/694,484 dated May 4, 1998.
Notice of Allowance from U.S. Appl. No. 08/694,484 dated Jul. 31, 1998.
Office action from U.S. Appl. No. 09/191,332 dated Jan. 19, 2000.
Response from U.S. Appl. No. 09/191,332 dated Apr. 18, 2000.
Notice of Allowance from U.S. Appl. No. 09/191,332 dated Jul. 3, 2000.
Notice of Allowance from U.S. Appl. No. 09/426,369 dated Oct. 20, 2000.
Office action from U.S. Appl. No. 09/607,468 dated Sep. 26, 2001.
Response from U.S. Appl. No. 09/607,468 dated Dec. 21, 2001.
Office action from U.S. Appl. No. 09/607,468 dated Apr. 18, 2002.
Response from U.S. Appl. No. 09/607,468 dated Jun. 21, 2002.
Notice of Allowance from U.S. Appl. No. 09/607,468 dated Jun. 28, 2002.
Response from U.S. Appl. No. 09/698,481 dated Mar. 27, 2002.
Response from U.S. Appl. No. 09/698,481 dated Oct. 29, 2002.
Office action from U.S. Appl. No. 09/712,547 dated May 23, 2001.
Response from U.S. Appl. No. 09/712,547 dated Aug. 23, 2001.
Office action from U.S. Appl. No. 09/712,547 dated Oct. 30, 2001.
Response from U.S. Appl. No. 09/712,547 dated Jan. 28, 2002.
Notice of Allowance from U.S. Appl. No. 09/712,547 dated Mar. 11, 2002.
Office action from U.S. Appl. No. 09/974,348 dated Feb. 27, 2003.
Response from U.S. Appl. No. 09/974,348 dated Jul. 28, 2003.
Office action from U.S. Appl. No. 09/974,348 dated Oct. 22, 2003.
Interview Record from U.S. Appl. No. 09/974,348 dated Oct. 28, 2003.
Response from U.S. Appl. No. 09/974,348 dated Jan. 26, 2004.
Advisory Action from U.S. Appl. No. 09/974,348 dated Feb. 27, 2004.
Response from U.S. Appl. No. 09/974,348 dated Apr. 16, 2004.
Notice of Allowance from U.S. Appl. No. 09/974,348 dated May 11, 2004.
Notice of Allowance from U.S. Appl. No. 09/974,348 dated May 20, 2005.
Response from U.S. Appl. No. 10/044,826 dated Oct. 29, 2003.
Notice of Abandonment from U.S. Appl. No. 10/044,826 dated Nov. 18, 2003.
Response from U.S. Appl. No. 10/044,826 dated Jan. 20, 2004.
Response from U.S. Appl. No. 10/044,826 dated Aug. 16, 2004.
Notice of Allowability from U.S. Appl. No. 10/044,826 dated Jun. 14, 2005.
Notice of Allowance from U.S. Appl. No. 10/044,826 dated Apr. 3, 2006.
Response from U.S. Appl. No. 10/390,133 dated Feb. 11, 2004.
Response from U.S. Appl. No. 10/390,133 dated Dec. 20, 2004.
Response from U.S. Appl. No. 10/390,386 dated Nov. 11, 2003.
Response from U.S. Appl. No. 10/390,386 dated May 28, 2004.
Response from U.S. Appl. No. 10/390,386 dated Mar. 16, 2005.
Office action from U.S. Appl. No. 10/444,826 dated Apr. 29, 2003.
Notice of Allowance from U.S. Appl. No. 10/643,010 dated Sep. 30, 2004.
Office action from U.S. Appl. No. 10/695,045 dated Feb. 22, 2005.
Response from U.S. Appl. No. 10/695,045 dated Jul. 25, 2005.
Office action from U.S. Serial No. 10/695,045 dated Oct. 20, 2005.
Response from U.S. Appl. No. 10/695,045 dated Jan. 17, 2006.
Notice of Allowance from U.S. Appl. No. 10/695,045 dated Apr. 11, 2006.
Office action from U.S. Appl. No. 10/762,977 dated Jan. 18, 2005.
Response from U.S. Appl. No. 10/762,977 dated May 18, 2005.
Notice of Allowance from U.S. Appl. No. 12/330,554 dated Sep. 23, 2011.
Amendment from U.S. Appl. No. 12/522,837 dated Jun. 15, 2011.
Notice of Allowance from U.S. Appl. No. 12/522,837 dated Jul. 26, 2011.
European Search Report from European Application No. 11156042.1 dated Jun. 7, 2011.
European Search Report from European Application No. 11156051.2 dated Apr. 28, 2011.
European Search Report from European Application No. 11161221.4 dated Jul. 22, 2011.
European Search Report from European Application No. 11161227.1 dated Jul. 22, 2011.
European Search Report from European Application No. 07 10 0483 dated Jun. 18, 2007.
Amendments under Article 34(2)(b) PCT and Comments from PCT/IB08/050111 dated Oct. 2, 2008.
International Preliminary Report on Patentability for International Patent Application No. PCT/IB08/050111 dated Apr. 22, 2009.
European Search Report from European Application No. 11157165 dated Aug. 4, 2011.
Notice of Allowance from U.S. Appl. No. 12/330,554 dated Nov. 15, 2011.
Notice of Allowance from U.S. Appl. No. 12/568,728 dated Oct. 26, 2011.
Office action from Canadian Application No. 2,690,500 dated Oct. 3, 2011.
Notice of Allowance from U.S. Appl. No. 11/472,509 dated Nov. 14, 2011.
Examiner-Initiated Interview Summary from U.S. Appl. No. 12/568,728 dated Dec. 8, 2011.

WHEELCHAIR SUSPENSION

RELATED APPLICATIONS

This application is a continuation application of U.S. patent application Ser. No. 11/474,834, filed Jun. 26, 2006 now U.S. Pat. No. 7,374,002 for WHEELCHAIR SUSPENSION which is a continuation of U.S. patent application Ser. No. 10/044,826, filed Oct. 19, 2001, now U.S. Pat. No. 7,066,290, for WHEELCHAIR SUSPENSION HAVING PIVOTAL MOTOR MOUNT, the entire disclosure of which is fully incorporated herein by reference.

FIELD OF THE INVENTION

The invention relates generally to conveyances and, more particularly, to wheelchair suspensions capable of traversing an obstacle or rough terrain.

BACKGROUND OF THE INVENTION

Wheelchairs are an important means of transportation for a significant portion of society. Whether manual or powered, wheelchairs provide an important degree of independence for those they assist. However, this degree of independence can be limited if the wheelchair is required to traverse obstacles such as, for example, curbs that are commonly present at sidewalks, driveways, and other paved surface interfaces.

In this regard, most wheelchairs have front and rear casters to stabilize the chair from tipping forward or backward and to ensure that the drive wheels are always in contact with the ground. One such wheelchair is disclosed in U.S. Pat. No. 5,435,404 to Garin. On such wheelchairs, the caster wheels are typically much smaller than the driving wheels and located both forward and rear of the drive wheels. Though this configuration provided the wheelchair with greater stability, it made it difficult for such wheelchairs to climb over obstacles such as, for example, curbs or the like, because the front casters could not be driven over the obstacle due to their small size and constant contact with the ground.

U.S. Pat. No. 5,964,473 to Degonda et al. describes a wheelchair having front and rear casters similar to Garin and a pair of additional forward lift wheels. The lift wheels are positioned off the ground and slightly forward of the front caster. Configured as such, the lift wheels first engage a curb and cause the wheelchair to tip backwards. As the wheelchair tips backwards, the front caster raises off the ground to a height so that it either clears the curb or can be driven over the curb.

U.S. Pat. No. 6,196,343 to Strautnieks also describes a wheelchair having front and rear casters. The front casters are each connected to a pivot arm that is pivotally attached to the sides of the wheelchair frame. Springs bias each pivot arm to limit the vertical movement thereof. So constructed, each front caster can undergo vertical movement when driven over an obstacle.

While the above-mentioned art provides various wheelchair configurations for traversing obstacles, a need still exists for a more complete wheelchair suspension.

SUMMARY OF THE INVENTION

One embodiment of the present invention relates to a wheelchair suspension. The suspension includes a frame, a pivot arm, a front caster, a drive assembly and a rear caster.

The pivot arm and the drive assembly are coupled and decoupled based on movement of the drive assembly.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

The present invention provides a suspension system having a pivot arm and a pivoting drive assembly wherein pivotal movement of the drive assembly engages the pivot arm during pivotal motion in one direction and disengages from the pivot arm during pivotal motion in a second direction. When the drive assembly is engaged with the pivot arm, moment arms generated by the drive assembly facilitate upward pivotal movement of the pivot arm to traverse obstacles and rough terrain. In this scenario, the drive assembly and pivot arm pivot act together thereby raising the front castor attached to the pivot arm. Disengagement of the drive assembly from the pivot arm facilitates a smoother ride because the drive assembly can pivot independently of the pivot arm. In this scenario, the drive assembly and pivot arm have independent pivotal motion and function as two separate components.

Figure 1:
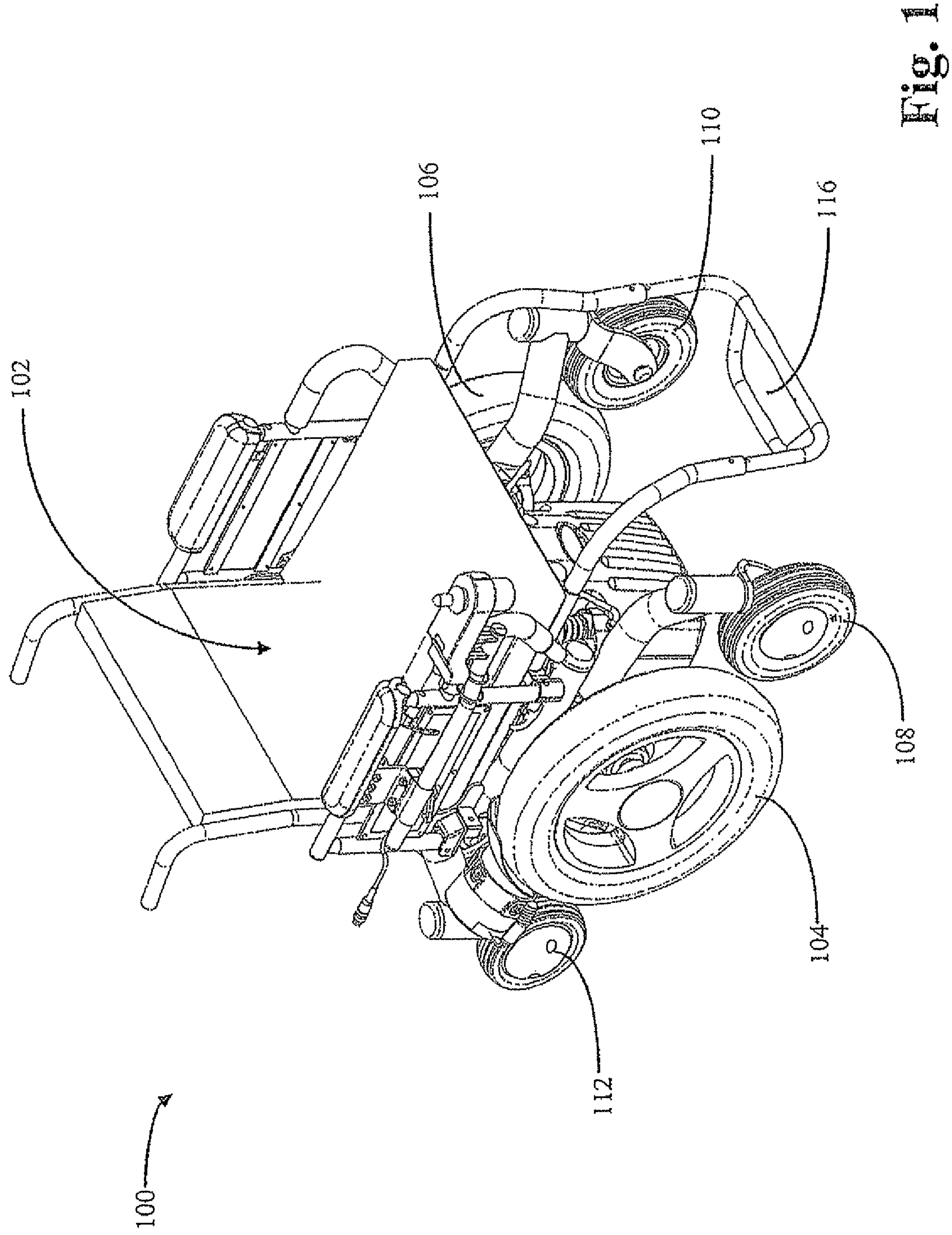
FIG. 1 is a perspective view of a wheelchair incorporating the suspension of the present invention.

Referring now to FIG. 1, a wheelchair 100 of the present invention is shown. Wheelchair 100 has a seat 102, drive wheels 104 and 106, front casters 108 and 110, and rear casters 112 and 114 (caster 114 shown in FIG. 2). Wheelchair 100 further has one or more footrests 116 and control circuitry for driving and steering the wheelchair. Wheelchair 100 is preferably configured as a mid-wheel drive wheelchair although other configurations are also possible.

Figure 2:
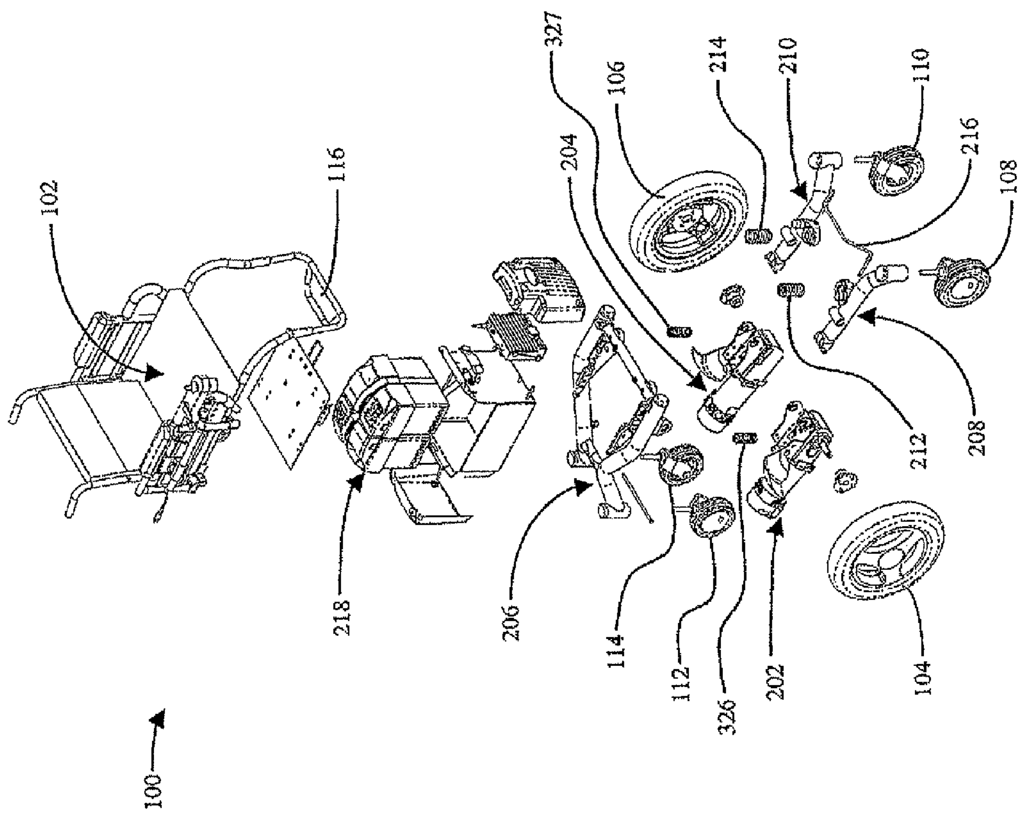
FIG. 2 is an exploded perspective view of certain components of the wheelchair of FIG. 1.

Illustrated in FIG. 2 is an exploded prospective view of wheelchair 100. In this regard, wheelchair 100 further has a frame 206 to which seat 102, front casters 108 and 110, and rear casters 112 and 114 are coupled. As will be described in more detail with reference to FIG. 3, wheelchair 100 has drive assemblies 202 and 204 and pivot arms 208 and 210 pivotally coupled to frame 206. Springs 212 and 214 are provided between pivot arms 208 and 210 and frame 206 to limit the amount of pivotal motion the arms can undergo. Additionally, a tension bar 216 is attached to and between pivot arms 208 and 210 to limit the amount of independent pivotal motion each arm can undergo before the other arm is influenced. The tension bar 216 is preferably made of a resilient spring-like metal that can undergo a limited amount of deformation or twisting and still return to its original shape or configuration. Batteries 218 are also provided and fit within frame 206 for providing power to drive assemblies 202 and 204.

Figure 3:
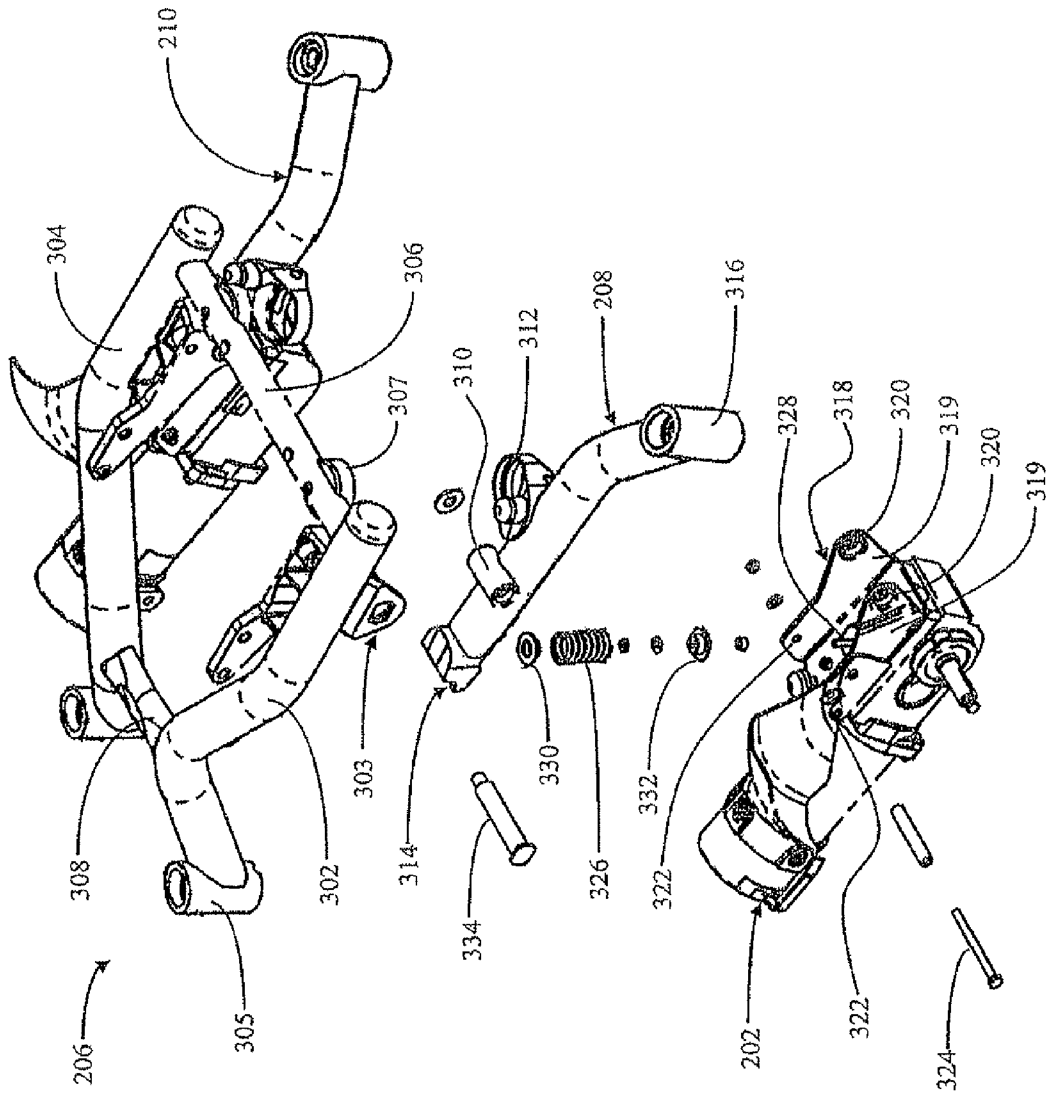
FIG. 3 is an exploded detail view of certain components of a frame and pivot assembly of the present invention.

Referring now to FIG. 3, an exploded prospective view of frame 206, pivot arm 208, and drive assembly 202 is provided. In this regard, frame 206 has a plurality of sub-members 302, 304, 306, and 308 coupled together as shown. In the preferred embodiment, frame sub-members 302, 304, 306, and 308 are preferably made of metal and welded together. Frame 206 further has a bracket 303 coupled to frame sub-member 302. Bracket 303 can be U-shaped having two spaced apart longitudinal extensions joined by a mid-section wherein the longitudinal extensions each have co-centered apertures therein for pivotally securing pivot arm 208 and drive assembly 202. Alternatively, bracket 303 can have two spaced apart longitudinal extensions that are welded or otherwise affixed to the bottom portion of frame sub-member 302 and include co-centered apertures for once again pivotally securing pivot arm 208 and drive assembly 202. Frame sub-member 304 has a similar bracket coupled thereto, but not shown.

Pivot arm 208 is preferably formed of tubular metal construction and has a head tube 316 for coupling a front caster thereto and a pivot arm engagement interface 314 for engaging drive assembly 202. As shown, head tube 316 is at the forward portion of pivot arm 208 and engagement interface 314 is to the rear portion thereof. Pivot arm 208 further has a pivotal mounting 310 that is between head tube 316 and engagement interface 314. Pivotal mounting 310 is preferably in the form of a cylindrical member that is either formed or attached to the body of pivot arm 208. Pivot arm 208 further has a spring seat 312 that aligns with a spring seat 307 for receiving and retaining compression spring 212 (compression spring 212 shown in FIG. 2). Pivot arm 210 is of similar construction.

Drive assembly 202 preferably has a motor/gearbox sub-assembly for driving one of the drive wheels and a pivotal mounting bracket 318. Alternately, the motor/gearbox assembly can be replaced with a brushless gearless motor drive. Pivotal mounting bracket 318 is in the form of a U-shaped bracket having spaced apart longitudinal members 319 joined by a mid-section at one of their ends. The mid-section is preferably used for mechanically attaching the motor/gearbox sub-assembly. The spaced apart longitudinal members 319 have projecting ear portions with co-centered apertures 320. Pivotal mounting bracket 318 further has a seat 328 for receiving a vertically-oriented compression spring 326 and its lower seat member 332. The upper portion of compression spring 326 along with upper seat member 330 are received within engagement interface 314 by a similar seat. In this regard, engagement interface 314 has a hollow space portion (not shown) for providing this configuration.

Drive assembly 202 further has a drive assembly engagement interface for engaging pivot arm 208. The drive assembly engagement interface has a pin or bolt 324 and co-centered apertures 322 in the longitudinal extensions 319 of pivotal mounting bracket 318. As will be presently described, the engagement interfaces of the drive assembly 202 and pivot arm 208 engage and disengage from each other under certain operating conditions.

Configured as such, pivot arm 208 and its pivotal mounting 310 are received within the longitudinal extensions 319 of pivotal mounting bracket 318 of drive assembly 202 with spring 326 seated in place. This sub-assembly is then received within the longitudinal extensions of mounting bracket 303 and the co-centered apertures therein. This entire assembly is then pivotally secured with a pin or bolt 334 that passes through the mounting bracket 303, drive assembly 202 bracket 318, and pivot arm 208 mounting tube 310. So formed, wheelchair 100 is provided with a suspension system wherein the drive assembly and pivot arm have a common pivotal coupling to the frame.

Figure 4A:
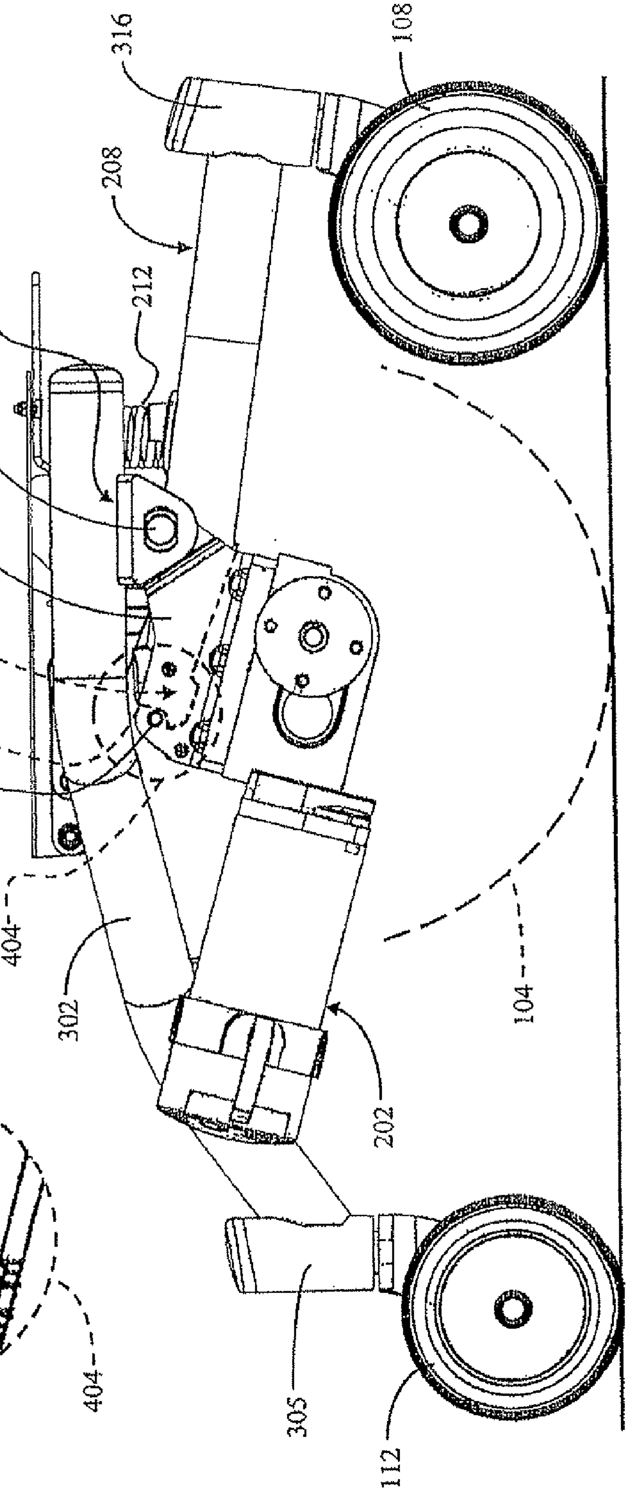
FIGS. 4A and 4B are side elevational views of the frame and pivot assembly under static conditions.
Figure 4B:
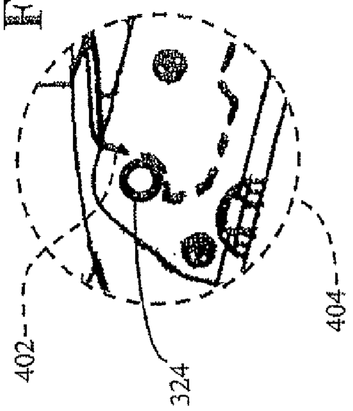

Referring now to FIGS. 4A and 4B, an elevational view of the suspension of wheelchair 100 under static conditions (i.e., no acceleration or deceleration) is shown. In this regard, all of the caster and drive wheels are in contact with the wheelchair supporting or driving surface. More specifically, the summation of the moment arms around pivot P is zero and, therefore, neither pivot arm 208 or drive assembly 202 undergo pivotal motion. Furthermore, spring 326 (shown in FIG. 3) urges the drive assembly engagement interface 324 into physical engagement with pivot arm engagement interface 314. More specifically, the force generated by spring 326 causes a surface of drive assembly engagement interface 324 to bear down upon engagement surface 402.

As shown more clearly in the enlarged detail 404 of FIG. 4B, pivot arm engagement interface 314 has an engagement surface 402 that is undulating in character and at least partially configured to receive drive assembly engagement interface 324. In this regard, engagement surface 402 is in the form a shoulder. However, any physical configuration that allows for the engagement and disengagement of drive assembly engagement surface 324 is contemplated.

Figure 5:
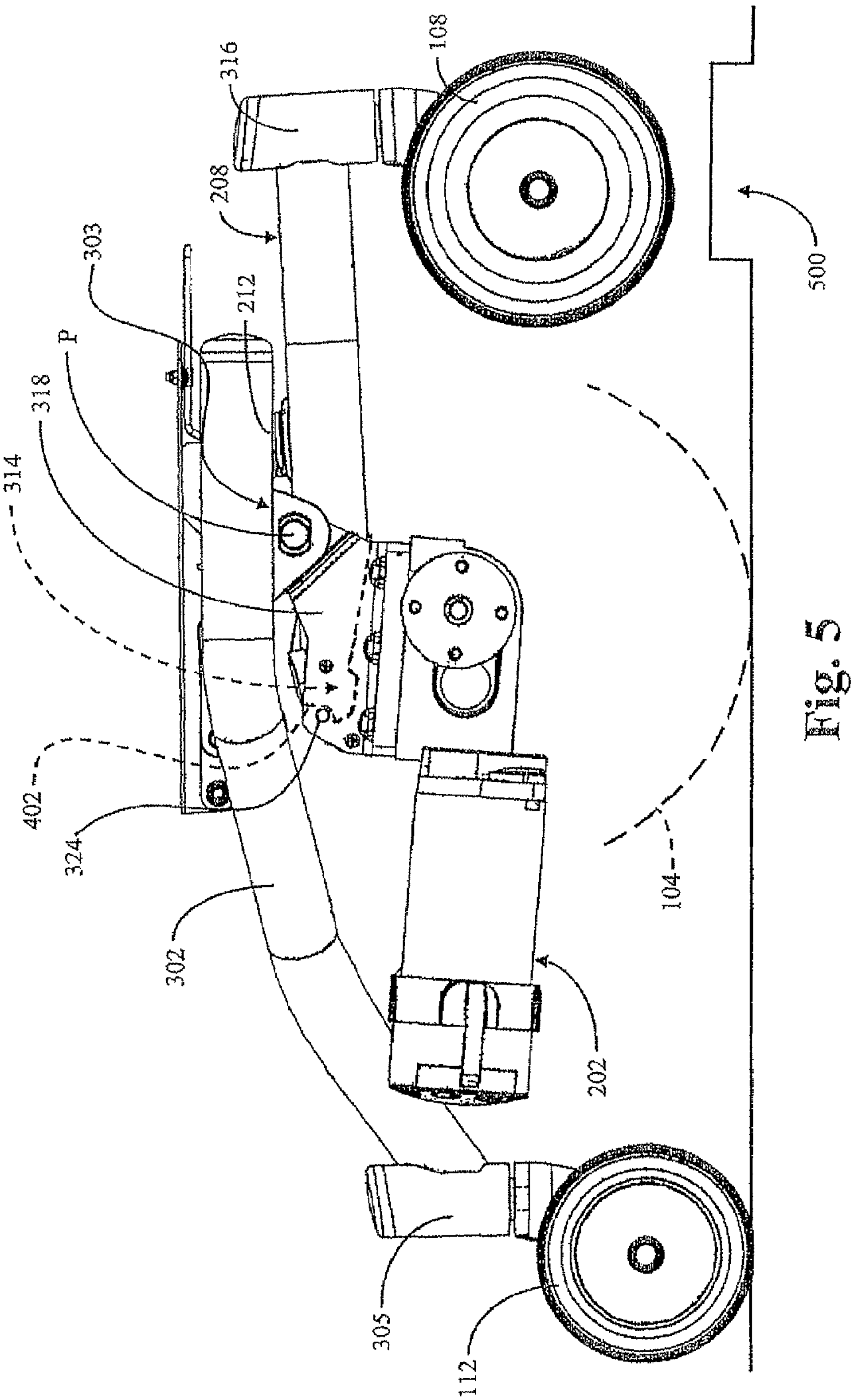
FIG. 5 is a side elevational view of the frame and pivot assembly traversing an obstacle by ascending an obstacle.

Illustrated in FIG. 5 is an elevational view of the suspension of wheelchair 100 traversing over an obstacle 500 by ascending the obstacle. This operating condition is accomplished by either rapidly accelerating wheelchair 100 in the forward direction or directly driving front caster 108 over obstacle 500. In this scenario, the moment arm generated by drive wheel 104 is greater then all other moment arms around pivot P. This causes drive assembly 202 to pivot counter-clockwise around pivot P. As such, drive assembly engagement interface 324 also pivots counter-clockwise around pivot P. In this scenario, drive assembly engagement interface 324 comes into engagement or already is in engagement with pivot arm engagement interface 314, thereby causing pivot arm 208 to also pivot counter-clockwise around pivot P. During this engagement, drive assembly engagement interface 324 is in physical contact with pivot arm engagement interface 314, as shown in FIG. 4B. This causes front caster 108 to rise above obstacle 500 or to be driven over obstacle 500. Hence, engagement interfaces 314 and 324 translate the pivotal motion of drive assembly 202 to pivot arm 208 to thereby raise front caster 108 to traverse obstacle 500.

Figure 6A:
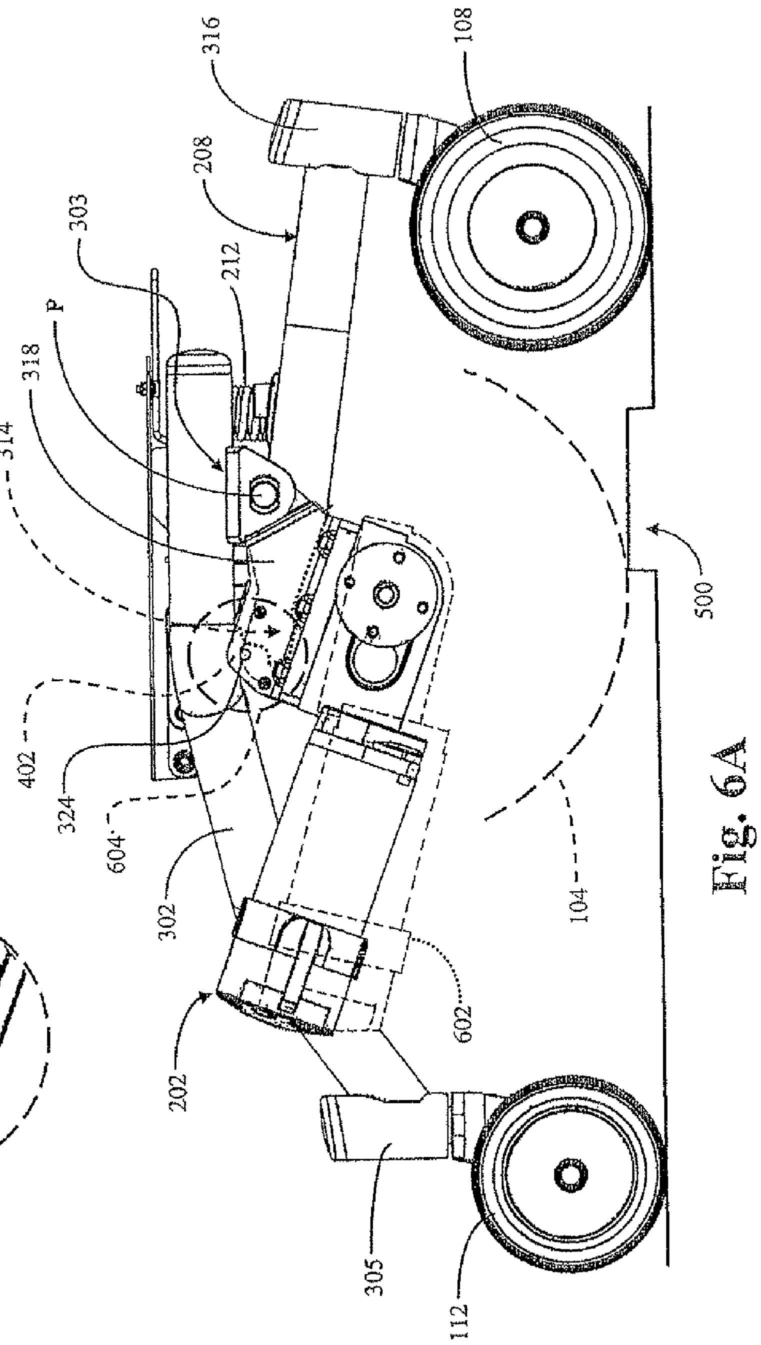
FIGS. 6A and 6B are further side elevational views of the frame and pivot assembly traversing an obstacle by ascending the obstacle.
Figure 6B:
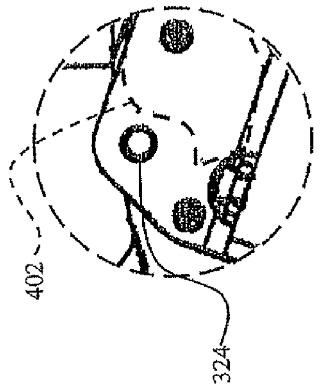

Referring now to FIGS. 6A and 6B, a side elevational view of the suspension of wheelchair 100 with drive wheel 104 traversing obstacle 500 is shown. In this regard, when drive wheel 104 comes into contact with obstacle 500, drive assembly 202 pivots in a clockwise direction around pivot P to soften the impact from obstacle 500. In FIG. 6A, the dashed outline 602 of drive assembly 202 represents the drive assembly's position prior to encountering obstacle 500 and the solid representation of drive assembly 202 represents its position after pivotal movement caused by encountering obstacle 500. During such pivotal movement, the drive assembly engagement interface 324 and the pivot arm engagement interface 314 physically disengage from each other. This state is more clearly shown in FIG. 6B wherein drive assembly engagement interface 324 is spaced apart from pivot arm engagement surface 402. The pivotal movement of drive assembly 202 is limited by spring 326 (shown in FIG. 3), which dampens the impact caused obstacle 500. After traversing obstacle 500, spring 326 causes drive assembly 202 to pivot counter-clockwise back to its position prior to encountering obstacle 500. This position includes the physical engagement between drive assembly engagement interface 324 and pivot arm engagement interface 314.

Figure 7:
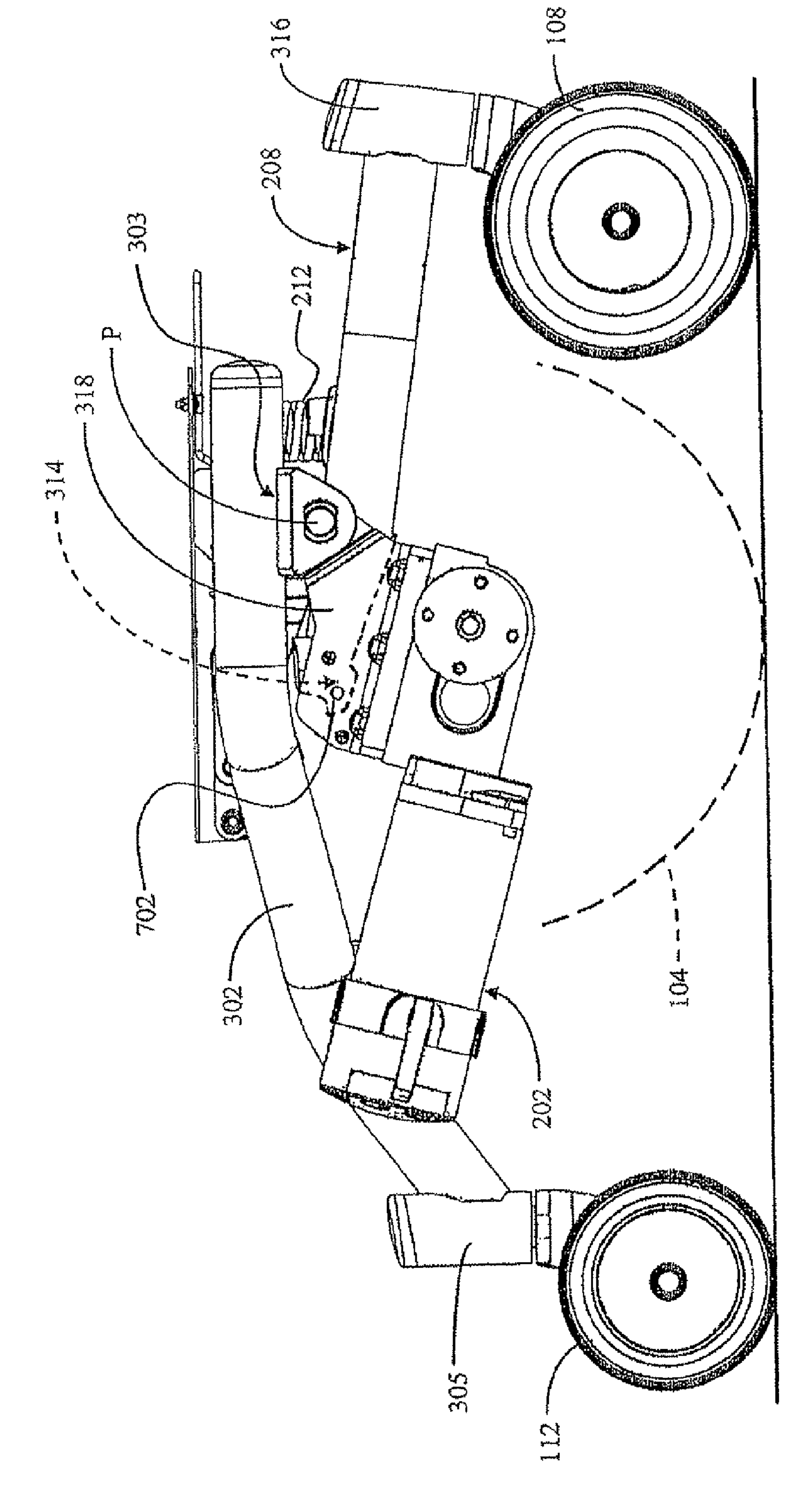
FIGS. 7, 8, and 9 are side elevational views of a second embodiment of the present invention.

Illustrated in FIG. 7 is a side elevational view of a second embodiment of the present invention. The second embodiment differs from the first in that the drive assembly 202 and the pivot arm 208 are rigidly coupled together. That is, the drive assembly 202 does not pivot independently of pivot arm 208. As a matter of design choice, springs 326 and 327 may or may not be used with this embodiment. This arrangement is facilitated by providing a latching mechanism between drive assembly 202 and pivot arm 208. In one embodiment, the latching assembly is in the form of a permanently welded or fastened pin 702. More specifically, pivotal mounting bracket 318 and pivot arm engagement interface 314 have co-centered apertures therein for receiving pin 702, which is then permanently affixed to either pivotal mounting bracket 318 and/or pivot arm engagement interface 314. In alternate embodiments, pin 702 can be a quick-release pin, threaded bolt, or screw allowing for a less permanent coupling. This would allow a user determine whether the drive motor assembly is pivotal or rigid with respect to the pivot arm 208 and frame 206.

Figure 8:
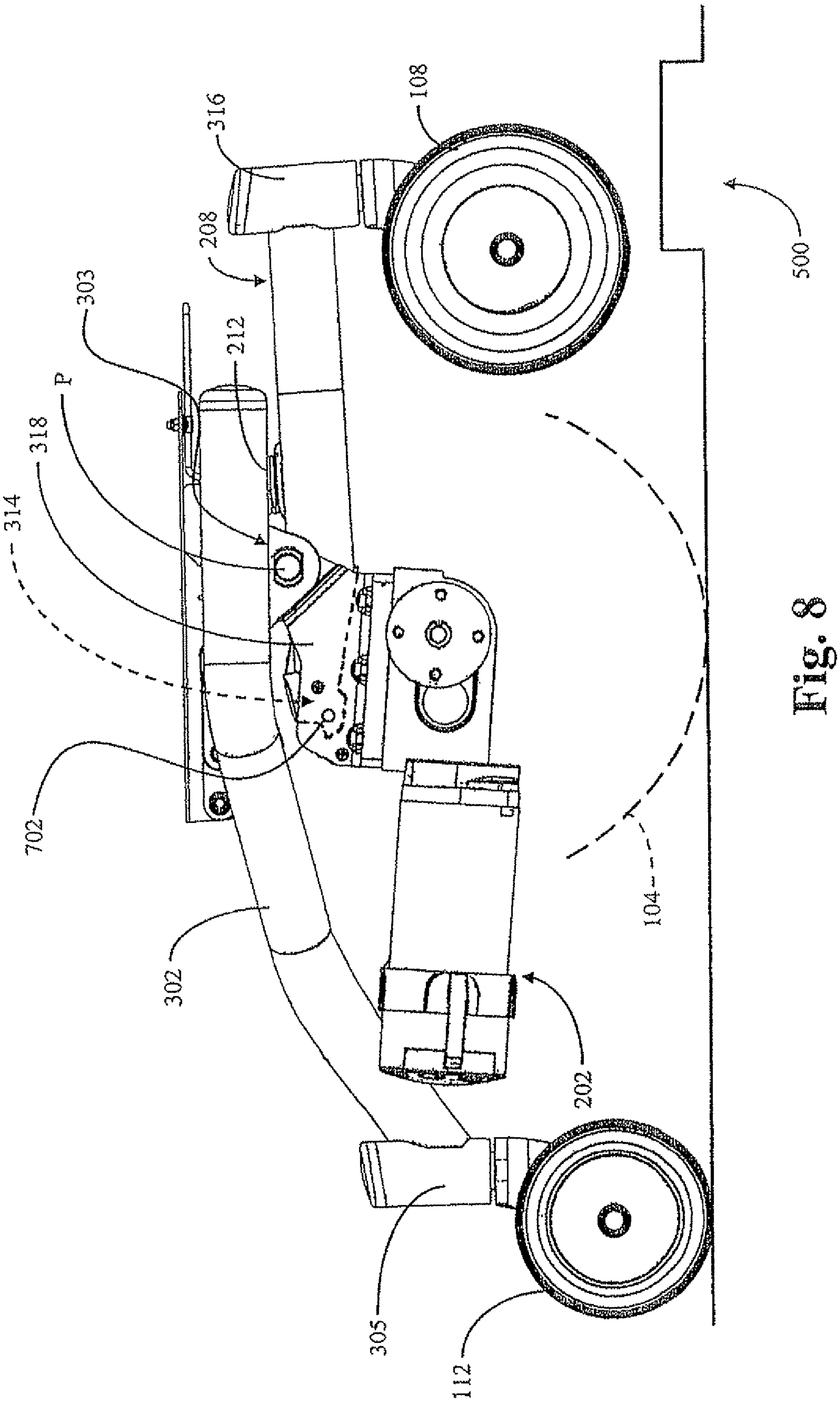

FIG. 8 illustrates the present embodiment when traversing obstacle 500 by ascending the obstacle. This operating condition is accomplished by either rapidly accelerating wheelchair 100 in the forward direction or directly driving front caster 108 over obstacle 500. In this scenario, the moment arm generated by drive wheel 104 is greater then all other moment arms around pivot P. This causes drive assembly 202 to pivot counter-clockwise around pivot P. Since drive assembly 202 is rigidly coupled to pivot arm 208 by pin 702, pivot arm 208 also pivots counter-clockwise around pivot P so as to lift front caster 108 to traverse obstacle 500.

Figure 9:
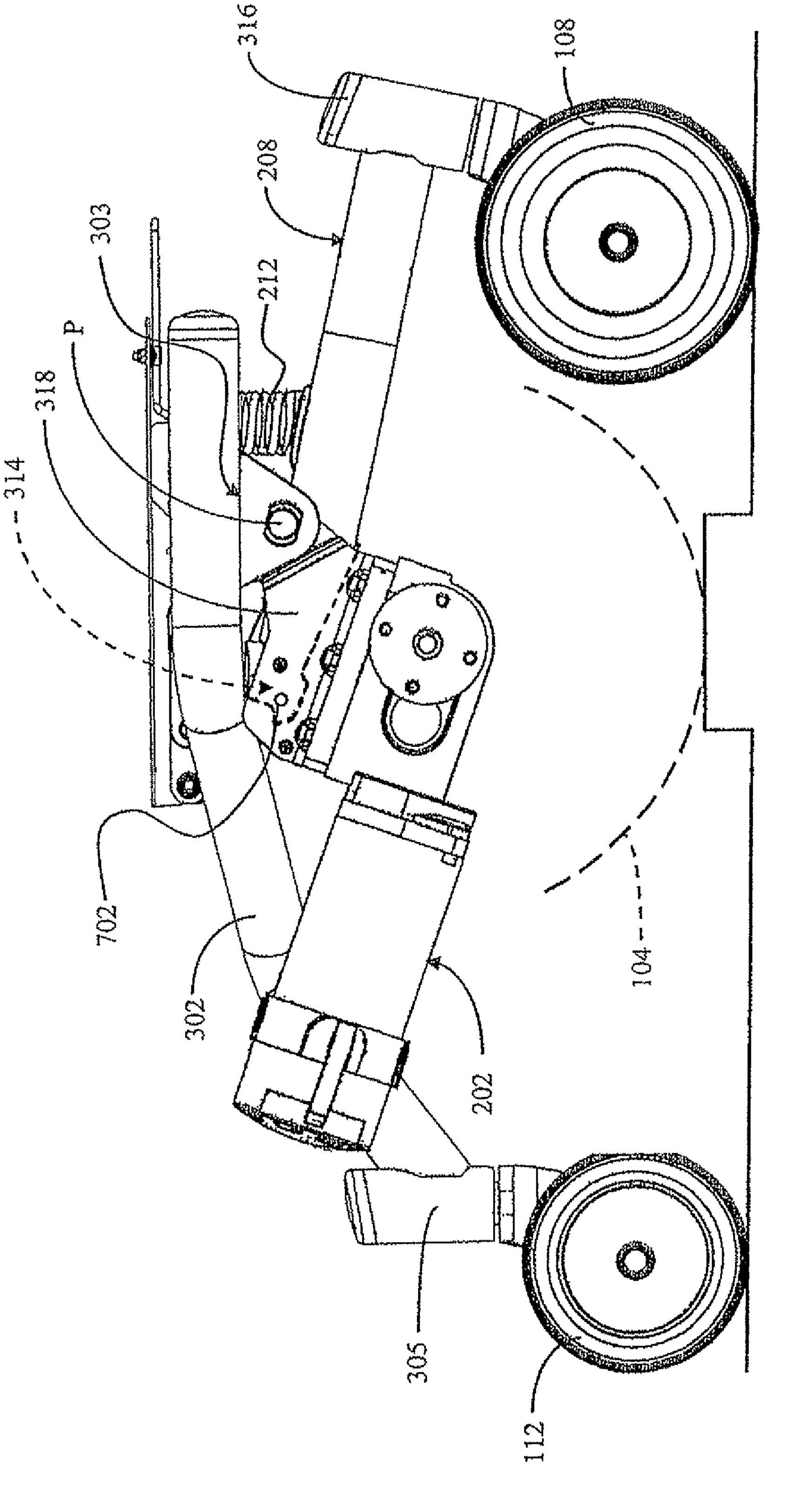

Illustrated in FIG. 9 is a side elevational view of the suspension of wheelchair 100 with drive wheel 104 traversing obstacle 500. In this regard, when drive wheel 104 comes into contact with obstacle 500, drive assembly 202 pivots in a clockwise direction around pivot P and causes pivot arm 208 and caster 208 to be brought down onto the lower driving surface elevation. Drive assembly 202 and pivot arm 208 act in unison due to their rigid coupling via pin 702, as described above. Springs 212 assist in this scenario by also urging pivot arm 208 to rotate about pivot P in clockwise direction. By causing pivot arm 208 and caster 108 to be brought down onto the lower driving surface elevation, the present invention provides the wheelchair with greater stability when traversing obstacle 500 and ensures that all of the wheelchair's wheel stay in constant contact with the wheelchair driving surface. Further embodiments of pivot arms, drive assemblies, and the dynamic analysis thereof are described in co-pending U.S. patent application Ser. No. 09/698,481, filed Oct. 27, 2000 and titled "Obstacle Traversing Wheelchair," which is hereby fully incorporated by reference.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, a plurality of casters can be used instead of one caster, one well-known latching means can be substituted for another, and the wheelchair component geometry can deviate from that shown without departing from the operative teaching herein. Therefore, the invention, in its broader aspects, is not limited to the specific details, the representative apparatus, and illustrative examples shown and described. Accordingly, departures can be made from such details without departing from the spirit or scope of the applicant's general inventive concept.

I claim:

1. A wheelchair comprising:
- a frame;
- a front caster assembly comprising a pivot arm that is pivotally coupled to the frame;
- a drive assembly that is pivotally coupled to the frame;
- an interface between the caster assembly and the drive assembly that engages and disengages based on relative movement between the drive assembly and the front caster assembly comprising:
  - at least one inwardly curved surface; and
  - at least one outwardly curved surface disposed substantially opposite the at least one inwardly curved surface.

2. The wheelchair of claim 1 wherein the at least one inwardly curved surface is disposed on the pivot arm.

3. The wheelchair of claim 1 wherein the at least one convex surface comprises an at least partially cylindrical geometry.

4. The wheelchair of claim 1 wherein the at least one outwardly curved surface comprises an at least partially cylindrical geometry disposed transverse to the pivot arm.

5. The wheelchair of claim 1 wherein the at least one inwardly curved surface comprises a recess disposed opposite the at least one outwardly curved surface.

6. The wheelchair of claim 1 wherein movement of the drive assembly in a first direction causes the at least one inwardly surface to decouple from the at least one outwardly curved surface and movement of the drive assembly in a second direction causes the at least one inwardly curved surface to engage the at least one outwardly curved surface.

7. The wheelchair of claim 6 wherein continued movement of the drive assembly in the second direction is transferred to the front caster assembly when the at least one inwardly curved surface engages the at least one outwardly curved surface.

8. The wheelchair suspension of claim 6 wherein the pivotal movement of the drive assembly in the second direction relative to the frame pulls the pivot arm upward to urge the front caster away from a support surface to traverse an obstacle.

9. A wheelchair comprising:
- a frame;
- a front caster assembly comprising a pivot arm that is pivotally coupled to the frame;
- a drive assembly that is pivotally coupled to the frame;
- an interface between the caster assembly and the drive assembly that engages and disengages based on relative movement between the drive assembly and the front caster assembly comprising:
  - at least one concave surface; and
  - at least one convex surface, the convex surface and the concave surface being moveable between a first position where the concave surface receives the convex surface to a second position where the concave surface and the convex surface are spaced apart.

10. The wheelchair of claim 9 wherein the at least one concave surface is disposed on the pivot arm.

11. The wheelchair of claim 9 wherein the at least one convex surface comprises an at least partially cylindrical geometry.

12. The wheelchair of claim 9 wherein the at least one convex surface comprises an at least partially cylindrical geometry disposed transverse to the pivot arm.

13. The wheelchair of claim 9 wherein the at least one concave surface comprises a recess disposed opposite the at least one convex surface.

14. The wheelchair of claim 9 wherein movement of the drive assembly in a first direction causes the at least one concave surface to decouple from the at least one convex surface and movement of the drive assembly in a second direction causes the at least one concave surface to engage the at least one convex surface.

15. The wheelchair of claim 14 wherein continued movement of the drive assembly in the second direction is transferred to the front caster assembly when the at least one concave surface engages the at least one convex surface.

16. The wheelchair suspension of claim 14 wherein the pivotal movement of the drive assembly in the second direction relative to the frame pulls the pivot arm upward to urge the front caster away from a support surface to traverse an obstacle.

17. A wheelchair comprising:
a frame;
a front caster assembly comprising a pivot arm that is pivotally coupled to the frame;
a drive assembly that is pivotally coupled to the frame;
an interface between the caster assembly and the drive assembly that engages and disengages based on relative movement between the drive assembly and the front caster assembly comprising:
a first surface that is undulating in character; and
a second surface, the first surface and the second surface being moveable between a first position where the undulating surface at least partially receives the second surface to a second position where at least a portion of the first surface and the second surface are spaced apart.

18. The wheelchair of claim 17 wherein the first surface is disposed on the pivot arm.

19. The wheelchair of claim 17 wherein movement of the drive assembly in a first direction causes the first surface to decouple from the second surface and movement of the drive assembly in a second direction causes the first surface to engage the second surface.

20. The wheelchair of claim 19 wherein continued movement of the drive assembly in the second direction is transferred to the front caster assembly when the first surface engages the second surface.

21. A wheelchair suspension comprising:
a frame;
a pivot arm pivotally coupled to the frame;
a front caster coupled to the pivot arm;
a drive assembly that is pivotally coupled to the frame;
a rear caster coupled to the frame;
an interface comprising a drive assembly interface surface and a pivot arm interface surface that are coupled such that movement of the drive assembly in a first direction decouples the drive assembly interface surface from the pivot arm interface surface and movement of the drive assembly in a second direction couples the drive assembly interface surface to the pivot arm interface surface.

22. The wheelchair suspension of claim 21 wherein pivotal movement of the drive assembly in the second direction pulls the pivot arm upward.

23. The wheelchair suspension of claim 22 wherein at least one of the interface surfaces comprise an undulating surface.

24. The wheelchair suspension of claim 22 wherein the drive assembly interface surface is configured to engage the pivot arm interface surface.

25. The wheelchair suspension for claim 21 wherein movement of the drive assembly in the first direction comprises upward movement of the drive assembly and movement of the drive assembly in the second direction comprises downward movement of the drive assembly.

* * * * *